(12) United States Patent
Gonzalez et al.

(10) Patent No.: US 7,178,406 B2
(45) Date of Patent: Feb. 20, 2007

(54) TEST BENCH FOR WIND TURBINES

(76) Inventors: Jose Ignacio Llorente Gonzalez, Poligono Industrial Los Agustinos, Calle A s/n, 31012 Pamplona, Navarra (ES); Gurutz Urzelai Iribarren, Poligono Industrial Los Agustinos, Calle A s/n, 31012 Pamplona, Navarra (ES)

( * ) Notice: Subject to any disclaimer, the term of this patent is extended or adjusted under 35 U.S.C. 154(b) by 159 days.

(21) Appl. No.: 11/054,219

(22) Filed: Feb. 9, 2005

(65) Prior Publication Data
US 2005/0172729 A1   Aug. 11, 2005

(51) Int. Cl.
*G01N 3/02*   (2006.01)
(52) U.S. Cl. ........................................................ 73/856
(58) Field of Classification Search .............. 73/865.8, 73/866.1, 432.1, 856
See application file for complete search history.

(56) References Cited

U.S. PATENT DOCUMENTS

| | | | | |
|---|---|---|---|---|
| 5,412,997 A | * | 5/1995 | Hu et al. | ....................... 73/827 |
| 5,753,799 A | * | 5/1998 | Shah | .............................. 73/40 |
| 6,862,940 B2 | * | 3/2005 | Romano | ...................... 73/856 |

* cited by examiner

*Primary Examiner*—Max Noori
(74) *Attorney, Agent, or Firm*—Sanchelima & Assoc, P.A.

(57) ABSTRACT

A test bench for wind turbines, comprising a test bed (1) on which the assembly (6) to be tested is mounted, and load application means for applying loads on said assembly. The assembly (6) to be tested is mounted on the foundation through a cylindrical support (5), provided with an upper rotary flange, which can be operated by means of a series of geared motors. The load application means comprise a fixed structure (7) anchored to the foundation, a mobile structure (8) which is anchored to the assembly (6) to be tested and a series of actuators (9) relating the mobile structure (8) with the fixed structure (7).

8 Claims, 5 Drawing Sheets

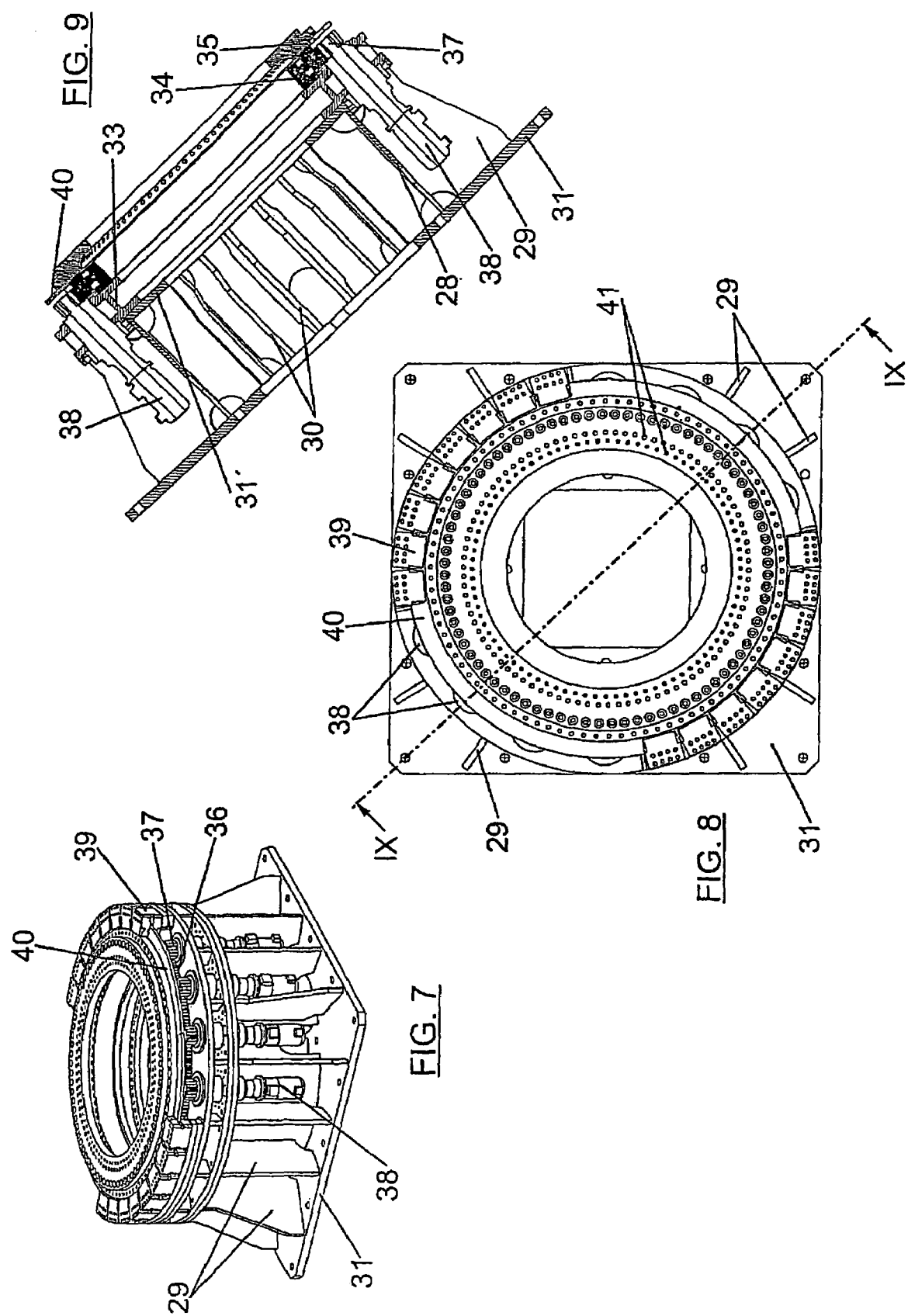

TEST BENCH FOR WIND TURBINES

The present invention refers to a test bench for wind turbines, and more specifically, for fatigue and maximum load tests of the different structural members or components of said turbines.

The bench of the invention is of the type comprising a test bed on which the assembly to be tested is mounted, and by the load application means for applying load on said assembly.

A test bench for turbines of the type set forth is known by Japanese patent JP 238376, by means of which the head of the wind turbine is subjected to the action of a series of hydraulic cylinders, with which the actions undergone by said head as a result of the blades during the functioning of the wind turbine in determined wind conditions are attempted to be reproduced. Nevertheless, this bench does not allow carrying out tests of the structural members of the wind turbine, such as the tower or column, the yaw mechanism forming the top of the tower, and the frame or frames supporting the rotor, gearbox, generator and other components of the wind turbine equipment, due to the dimensions and weight of the structural assembly of the wind turbine and to the loads to which said assembly should be subjected.

The object of the present invention is a test bench for wind turbines which allows carrying out fatigue and load tests of the assembly of structural members of the wind turbine, subjecting said assembly to stresses which allow, in a relatively short period of time, obtaining an equivalent response to that which would occur throughout the useful life thereof.

The bench of the invention comprises a test bed made up of a reinforced concrete-based foundation, of sufficient depth and strength to support the stresses of the tests to be carried out. The assembly to be tested is mounted on this test bed through a cylindrical support structure which is anchored to the foundation, and includes a rotary flange for the anchoring of the assembly to be tested, a ring gear fixed to the rotary flange, a series of geared motors with pinions engaging with the ring gear in order to actuate the flange, and a series of brakes capable of acting on a brake disc which is solidly connected to the rotary flange.

For the anchoring of the aforementioned cylindrical support structure to the foundation, said foundation is provided, in the area on which the cylindrical support is situated, with rails running in a direction perpendicular to the area occupied by the load application means for applying loads on the assembly to be tested, the cylindrical support structure being able to move on these rails, so as to adjust its distance from the load application means.

In the bench of the invention, the load application means comprise a fixed structure, which is also anchored to the foundation, a mobile structure provided with means for anchoring it to the assembly to be tested, and a series of actuators relating the mobile structure to the fixed structure.

The assembly of the rotating structure on the cylindrical support structure is carried out through a ball bearing or bearing which will allow the rotation of said flange.

The cylindrical support structure includes a vertical cylindrical wall, which is internally and externally reinforced by axial partitions. The cylindrical wall ends at the lower end with a flange for anchoring it to the foundation, and at the upper end, with a flange on which a frame is fixed, on which frame the geared motors, the ball bearing or bearing on which the rotary flange rests, and the brakes for said rotary flange are mounted.

As already indicated, the load application means include a mobile structure and a fixed structure. The mobile structure is suspended from the fixed structure through several cardan and ball-and-socket joints and is related to said fixed structure through a series of hydraulic linear actuators, by means of which the static and dynamic loads will be applied to the assembly to be tested.

The hydraulic linear actuators comprise dynamic actuators, made up of axial servohydraulic cylinders, each one of which is jointed at one end to a point of the mobile structure, which points are located around the means for anchoring said structure to the assembly to be tested. At the other end, the servohydraulic cylinders are jointed in pairs to anchoring points of the fixed structure. Furthermore, the hydraulic linear actuators may include static actuators, constituted of auxiliary hydraulic cylinders, by means of which extreme loads are induced on the assembly to be tested. These auxiliary cylinders are jointed at one of their ends to the fixed structure, at the joint anchorings of the dynamic actuators, and to the mobile structure at points not coinciding with those of the jointing of said dynamic actuators.

The mobile structure can be made up of a three-dimensional structure adopting an approximately truncated pyramidal shape, on the major base of which the connection means to the assembly to be tested are situated in a central position, whilst the jointing points of the dynamic actuators are located in a position coinciding with the vertices of this major base.

The constitution and the features of the test bench of the invention will be better understood with the following description, made with reference to the attached drawings, in which a non-limiting embodiment is shown.

In the drawings:

FIG. 7 shows a perspective view of the cylindrical support structure on which the assembly to be tested is mounted.

FIG. 8 shows an upper plan view of the cylindrical structure of FIG. 7.

FIG. 9 shows a diametrical section view of the cylindrical structure, taken along section line IX—IX of FIG. 8.

Figure 1:
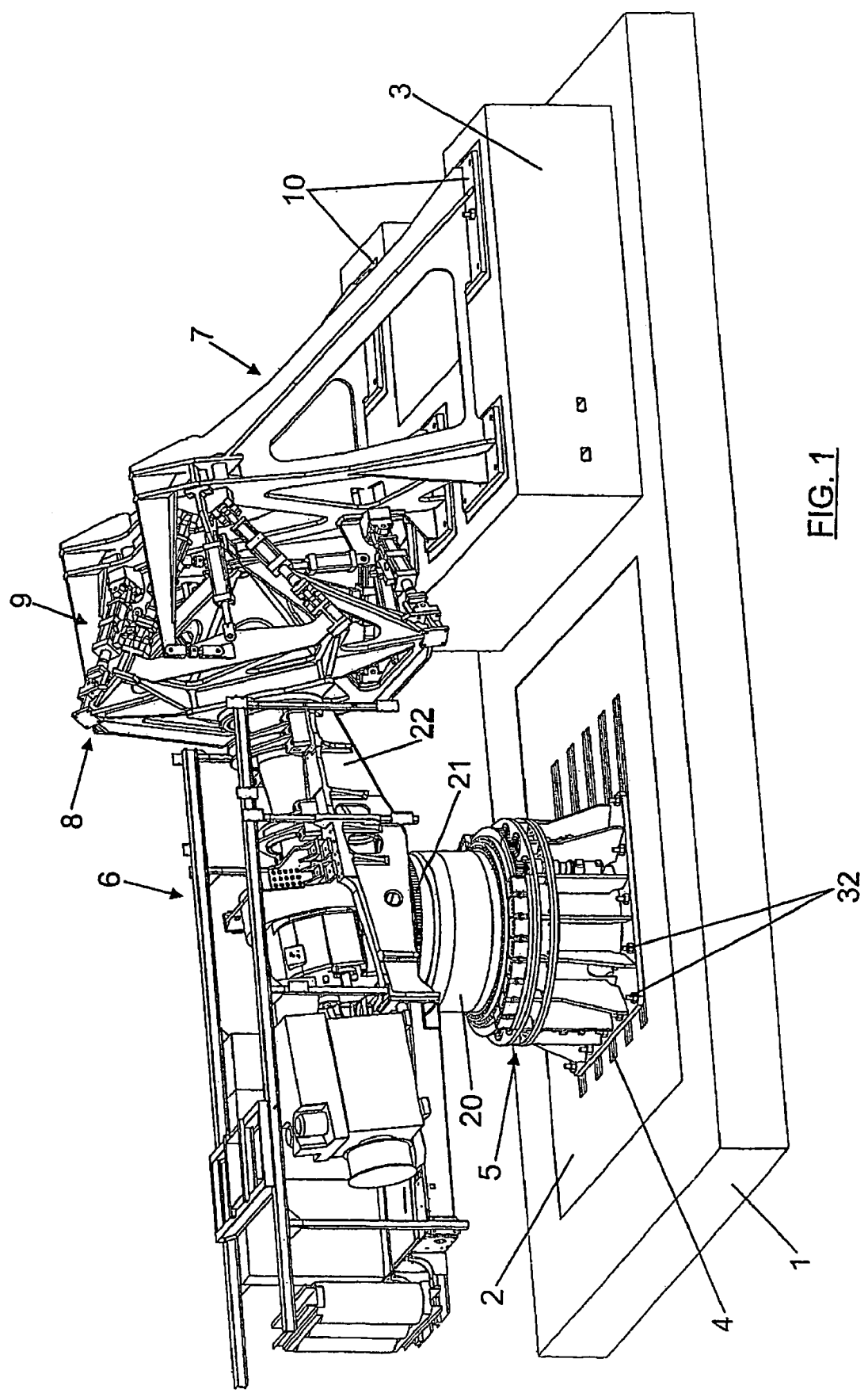
FIG. 1 shows a perspective view of a test bench constituted according to the invention.

The test bench shown in FIG. 1 comprises a test bed 1 made up of a reinforced concrete-based foundation, of sufficient depth to support the stresses and loads of the test to be carried out, and only the upper part of which is shown in FIG. 1. In the example shown in the drawings, the foundation or test bed includes two areas situated at different heights, one of lower height, which is referenced with number 2, and another of greater height, which is referenced with number 3. Rails 4 are arranged on the area of lower height 2, on which rails a cylindrical support structure 5 is anchored, where the assembly to be tested, generally referenced with number 6, is mounted. The load application means, constituted of a fixed structure 7, a mobile structure 8, and a series of actuators generally referenced with number 9 relating the mobile structure 8 with the fixed structure 7, are mounted on the area of greater height 3.

The fixed structure 7 ends at the lower part thereof with plates 10 for anchoring it to area 3 of the test bed, and at the upper part has two cantilever arms 11 from which the mobile structure 8 is suspended, for example by means of cardan or ball-and-socket joints.

Figure 5:
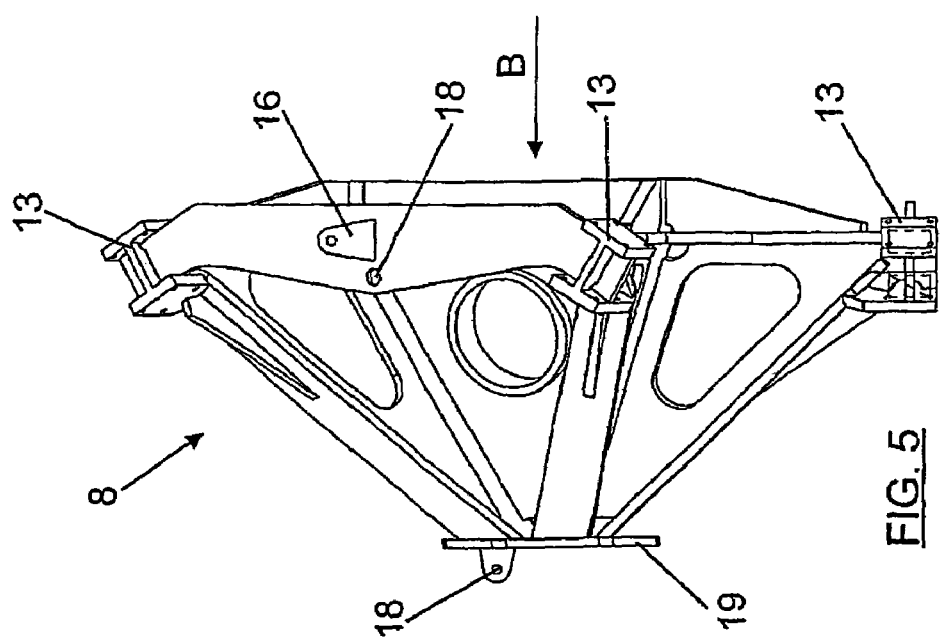
FIG. 5 shows a side elevation view of the mobile structure of the load application means.
Figure 6:
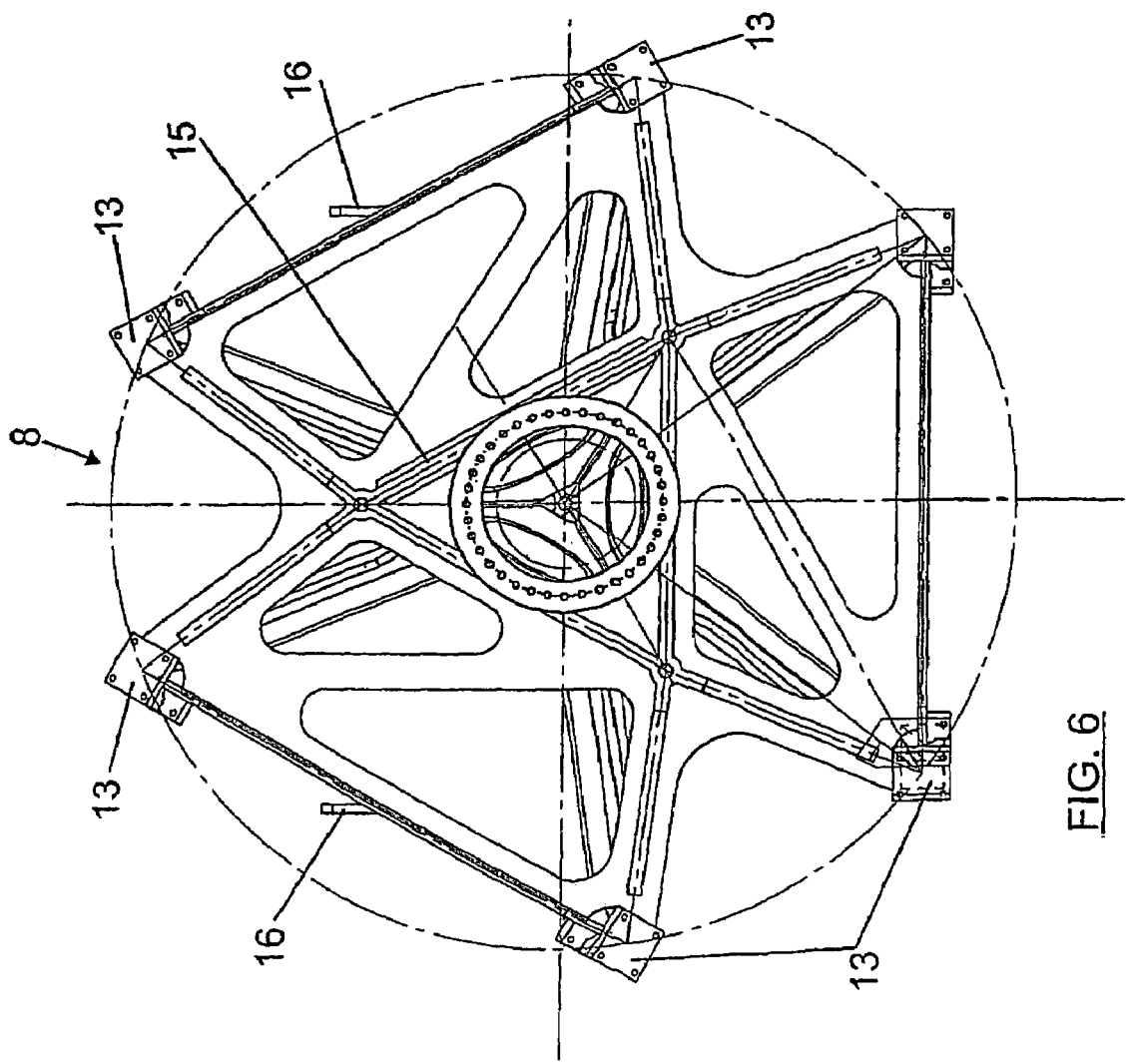
FIG. 6 shows a front elevation view of the same mobile structure, according to direction B of FIG. 5.

In the example shown in the drawings, the hydraulic linear actuators 9 are constituted of six dynamic actuators referenced with number 12, made up of the same number of axial servohydraulic cylinders, which are jointed at one end to the same number of points 13 of the mobile structure, as can be better observed in FIG. 6, whereas on the opposite end, said actuators are jointed in pairs to anchorings 14 of the fixed structure 7. As can be better observed in FIGS. 5 and 6, the mobile structure is constituted of a three-dimensional structure adopting an approximately hexagonal truncated pyramidal shape, on the major base of which means 15 for connecting the assembly 6 to be tested are situated in a central position, whereas the points 13 to which the dynamic actuators 12 are jointed are situated in a position coinciding with the vertices of the base. Furthermore, this mobile structure has two side lugs 16 which will serve to suspend said structure from the arms 11 belonging to the fixed structure, by means of cardan or ball-and-socket joints 11'.

The group of actuators 9 further includes six static actuators 17, constituted on the basis of auxiliary hydraulic cylinders, which will serve to induce extreme loads on the assembly 6 to be tested. These cylinders 17 are jointed at one of their ends to the fixed structure 7 at the joint anchorings 14 of the dynamic actuators, whereas they are jointed to the mobile structure 8 at points 19 not coinciding with the jointing points 13 of the dynamic actuators.

Figure 4:
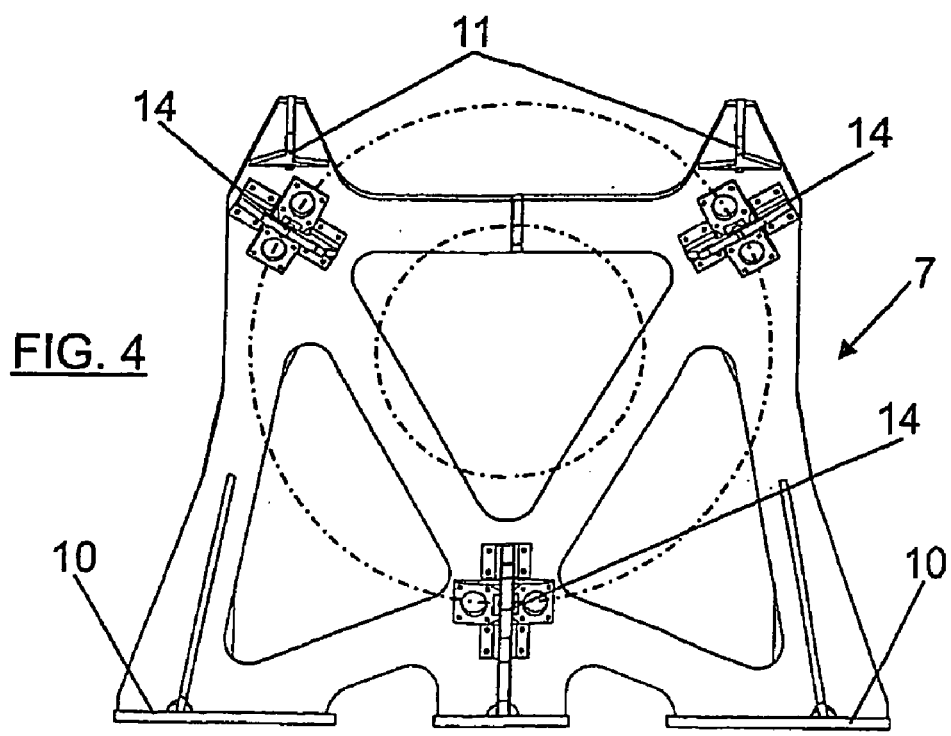
FIG. 4 shows a front elevation view of the same fixed structure, according to direction A of FIG. 3.

As can be better observed in FIG. 6, the connection points 13 of the dynamic actuators to the mobile structure are arranged around the anchoring means 15 of this structure to the assembly 6 to be tested. Likewise, the anchoring points 14 of the pairs of the dynamic actuators to the fixed structure 7 are situated on one same circumference which is concentric with that defined by the union means 15 between the mobile structure and the assembly to be tested, all of this as can be clearly observed in FIGS. 4 and 6.

Figure 2:
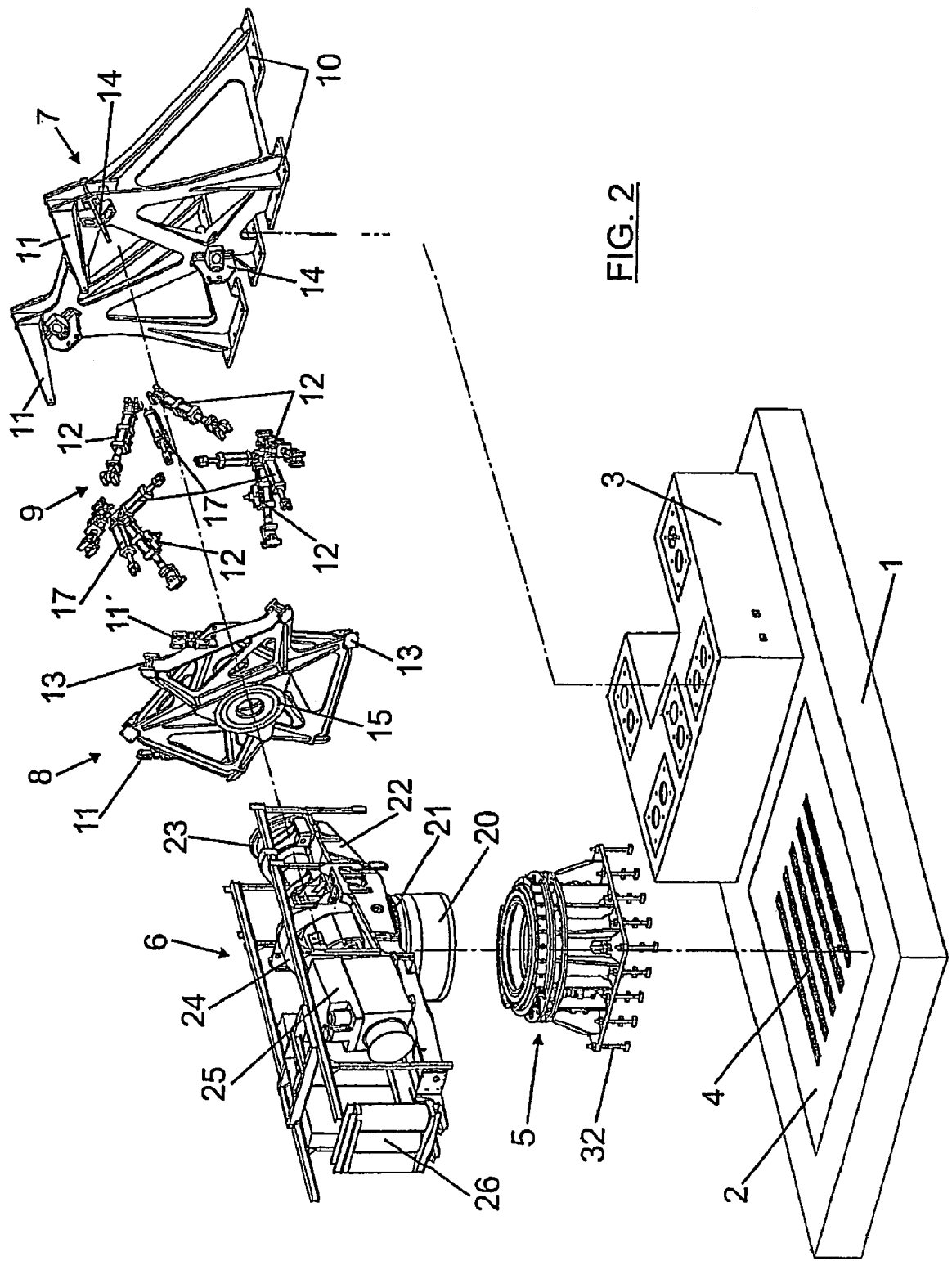
FIG. 2 shows an exploded perspective view of the bench of FIG. 1.
Figure 3:
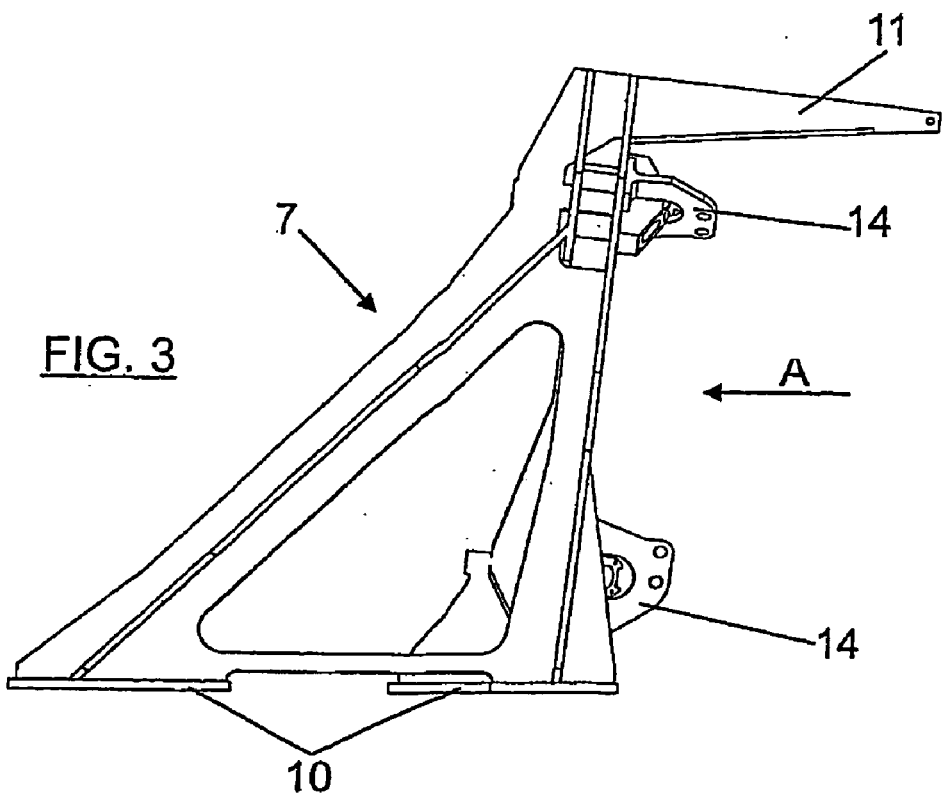
FIG. 3 shows a side elevation view of the fixed structure of the load application means.

As can be observed in FIGS. 1 and 2, the assembly 6 to be tested includes an upper span 20 of the wind turbine tower or column, the yaw mechanism 21 forming the top of the tower, and the frame or frames 22 supporting the low speed shaft 23, the gearbox 24, the generator 25, transformer 26 and other components of the wind turbine equipment.

Finally, the cylindrical structure 5, as can be better observed in FIGS. 7 to 9, comprises a vertical cylindrical wall 28, which is reinforced by outer 29 and inner 30 axial partitions. This wall ends at the lower part with a flange 31 for anchoring it to the test bed 1, by means of screws 32 the position of which can be adjusted along the rails 4, in a direction perpendicular to area 3 of the test bed or foundation on which the load application means are arranged. On the upper edge, the cylindrical wall 28 ends with a second flange 31' on which a frame 33 is fixed, on which frame a rotary flange 35 is mounted through a ball bearing 34, on which flange the upper span 20, FIG. 1, of the column or tower is anchored. The ball bearing 34 has an outer toothing 36 with which pinions 37 engage, actuated by geared motors 38 mounted on the frame 33. Finally, brakes 39 capable of acting on a brake disc 40 solidly connected to the rotary flange 35 are mounted on the frame 33.

As can be best observed in FIG. 8, this rotary flange 35 has a vast number of holes 41 for the anchoring of the upper span 20 of the tower.

The bench of the invention allows three types of tests to be carried out: fatigue tests, ultimate load tests and tests of the yaw system.

By means of the bench of the invention, combined fatigue tests ($F_x$, $F_y$, $F_z$, $M_x$, $M_y$, $M_z$) can be applied on the shaft of the assembly to be tested, using to this end a hydraulic excitation system, made up of the dynamic 12 and static 17 actuators. This excitation system will allow applying substantial dynamic loads (forces between 50 and 100 kN and moments of between 400 and 1000 kN.m), reduced to the shaft of the assembly to be tested, with an application frequency of between 1 and 2 Hz, which will allow simulations equivalent to 20 years of life to be undertaken in approximately four months of testing.

Furthermore, the bench of the invention will allow the wind turbine to be tested with all its installed component members, with the exception of the casing, the blades and the hub, as has been described. Also, as a result of the constitution of the cylindrical support structure 5, the bench of the invention will allow the operation of the rotation system belonging to the wind turbine itself during the development of the fatigue test, such that the test can be carried out simulating real working conditions.

The ultimate load tests will allow checking that the breakage of the tested assembly does not occur when subjecting said assembly to extreme static working loads.

With the constitution described, the bench of the invention includes a load application system, mounted on area 3 of the test bed or foundation, and a counterrotation system, which is mounted on area 2. The bench is completed with a data acquisition system and a general control system.

The load application system, made up of the fixed structure 7, mobile structure 8 and actuators relating the two structures, is completed with a hydraulic power unit and with a hydraulic control system. The fixed structure 7 allows the transmission of the reactions of the hydraulic cylinders making up the dynamic and static actuators to the concrete test bed 1. This structure 7 will be of a metallic nature, for example of very rigid welded sheet metal with a great static and fatigue resistance. For its part, the mobile structure 8 is that which allows the transmission of the stresses transmitted by the dynamic and static actuators to the main shaft of the assembly 6 to be tested and consists, as has already been set forth, of a lattice-type space frame, made up of light welded sheet metal, which is rigid and has great static and fatigue resistance. The hydraulic power unit will be formed by the hydraulic groups necessary for serving the static and dynamic actuators, above all the latter, in order for these to work at the intended frequencies. The hydraulic power system will be completed with a main distributor and with the necessary hydraulic distribution tubes. Finally, the hydraulic control system will provide the actuators with the necessary load instructions allowing the necessary functioning synchrony for the test, and which will otherwise control the functioning of the actuators.

With respect to the counterrotation system, defined by the structure 5, this will fulfil two functions: to serve as a support and anchoring of the assembly 6 to be tested, and to ensure the continuous alignment of the equipment to be tested with respect to the actuation system.

As has already been set forth, the structure 5 constituting the yaw system will allow moving the assembly to be tested in a direction perpendicular to the means for the application of the loads, by means of the rails 4.

On the other hand, and also as explained, the test bench of the invention must allow for the rotation system belonging to the wind turbine, for which reason, in order to maintain the turbine permanently aligned towards the load application means, a counterrotation system becomes necessary, allowing the relative movement between the upper span 20 of the tower, FIG. 1, and the foundation, and which is made up of the cylindrical wall 28, the frame 33, the rotary flange 35, the ball bearing 34 with the ring gear 36, the gearboxes 38, the brakes 39 and misalignment sensors (not shown).

The ring 36 will allow for the counterrotation system by means of the triggering of the gearboxes 38, which will actuate the counterrotation system when said instruction is transmitted to them by the general control system on detecting a misalignment, being controlled by means of frequency shifters, which will in turn be supervised by a PLC of the general control system.

With respect to the brakes 39, these will ensure that the counterrotation system remains immobile when so imposed by the general control system, acting on the disc 40 solidly connected to the rotary flange 35.

The misalignment sensors will give the general control system information regarding the turning angle of the assembly to be tested with respect to its theoretical position, such that they allow it to determine whether it is necessary to actuate the counterrotation system in order to correct the possible misalignment. This actuation is carried out in a closed vessel and immediately follows a detection of the misalignment.

As already indicated, the test bench of the invention will be provided with a data acquisition system and with a general control system.

The data acquisition system will be formed by the set of electronic equipment, which will be in charge of collecting, and recording all the significant parameters involved in the test. The fundamental parameters to be monitored are:

Real forces transmitted at the point of application of the loads.
Forces and displacements of the dynamic actuators.
Instruction pressures imposed on the static actuators.
The measurements of displacement, deformations and accelerations of the assembly to be tested which may be of interest in characterising the test.
Alarms of the state of the test specimen and of the actuators.

The main components of the data acquisition system are: field instrumentation and a digitiser and storage unit.

The field instrumentation will be in charge of sensing the parameters of the test to be monitored. These may be strain gages (deformations), LVDTs (displacements) and accelerometers (vibrations) to be placed above the assembly to be tested, as well as the load cells and LVDTs belonging to the dynamic actuators themselves.

The digitiser and storage unit will be made up of the set of electronic and computer equipment (racks and PC) which will be in charge of digitising the signals obtained, the response in the assembly to be tested, processing and recording them together with the input loads in the same time base.

Finally, the central control system will be hierarchically above the rest of the bench system (load application system, counterrotation system, data acquisition system, rotation system belonging to the nacelle itself and safety system), and will be in charge of carrying out the following general functions:

Management and supervision of the overall state of the system, providing the operator with sufficient information regarding the state.

Coordination of the operation of the different subsystems of the bench: orientation of the nacelle (actuation of the rotation system belonging to it), control of the counterrotation system (actuation of the counterrotation system), management of the operation of the data application system, and basic command of the load application system.

Management of alarms and state of the system.
Safe stopping of the bench in the event of an emergency or the fault of any system.

With a view to all of this, the system will rely on the following equipment: a central PC, and a PLC (programmable automation).

With the PC as a user interface and by means of the commands, which the PLC will establish, the general control system will be in charge of sending the signals to the different subsystems in order for these to act in coordination in the carrying out of the test.

The invention claimed is:

1. A test bench for wind turbines, comprising a test bed (1) on which the assembly (6) to be tested is mounted, load application means for applying loads on said assembly, a data collection system, and a general control system, characterised in that the assembly (6) to be tested is mounted on the foundation (1) through a cylindrical support structure (5) which is anchored to said foundation (1) and includes a rotary flange (35) for the anchoring of the assembly to be tested, a geared ring (36) fixed to the rotary flange, a series of geared motors (38) with pinions (37) engaging with the geared ring (36), and a series of brakes (39) capable of acting on a brake disc (40) solidly connected to the rotary flange; and in that the load application means comprise a fixed structure (7), which is anchored to the test bed, a mobile structure (8) which has means for anchoring it to the assembly to be tested, and a series of actuators relating the mobile structure with the fixed structure (7).

2. A bench according to claim 1, characterised in that the rotary flange (35) rests on the support structure (5) anchored to the test bed through a ball bearing or bearing (34).

3. A bench according to claim 1, characterised in that in the area (2) on which the support (5) bearing the assembly (6) to be tested is situated, the test bed has rails (4) running in a direction perpendicular to the area (3) occupied by the fixed structure (7) of the load application means, on which rails the aforementioned support is mounted and can be displaced, so as to adjust its distance from said application means.

4. A bench according to claim 1, characterised in that the cylindrical support structure (5) is constituted of a vertical cylindrical wall reinforced with inner (30) and outer (29) axial partitions, ending at its lower part with an anchoring flange (31) to the foundation, and at its upper part with a flange (31') on which a frame (33) is fixed, on which frame the geared motors (38), the ball bearing or bearing (34) on which the rotary flange (35) rests, and the brakes (39) for said flange are mounted.

5. A bench according to claim 1, characterised in that, in the load application means, the mobile structure (8) is suspended from the fixed structure (7) through several cardan or ball-and-socket joints (11') and is related with said fixed structure through a series of hydraulic and linear actuators (9) by means of which the loads are applied on the assembly to be tested.

6. A bench according to claim 5, characterised in that the hydraulic linear actuators comprise six dynamic actuators (12), made up of the same number of axial servohydraulic cylinders, which are jointed at one end to the same number of points (13) of the mobile structure, situated around the anchoring means (15) of said structure to the assembly to be tested, whereas they are jointed at the opposite end in pairs through anchorings (14) of the fixed structure (7).

7. A bench according to claim 5, characterised in that the hydraulic linear actuators further include several static actuators (17), constituted of auxiliary hydraulic cylinders, by means of which extreme loads are induced on the assembly to be tested, which cylinders are jointed at one of their ends to the fixed structure at the joint anchorings (14) of the dynamic actuators, and at the other end to the mobile structure at points (19) not coinciding with those of the jointing of said dynamic actuators.

8. A bench according to the previous claims, characterised in that the mobile structure (8) is of a three-dimensional configuration, of an approximately hexagonal truncated pyramidal shape, on the major base of which the anchoring means (15) to the assembly to be tested are situated in a central position, and the jointing points (13) of the dynamic actuators (12) being in a position coinciding with its vertices.

* * * * *